(12) United States Patent
Croutxe-Barghorn et al.

(10) Patent No.: US 9,394,461 B2
(45) Date of Patent: Jul. 19, 2016

(54) RADIATION RADICALLY AND CATIONICALLY CURABLE COMPOSITION, AND METHOD FOR PREPARING A HYBRID SOL-GEL LAYER ON A SURFACE OF A SUBSTRATE USING SAID COMPOSITION

(71) Applicants: Universite de Haute-Alsace, Mulhouse (FR); Socomore, Vannes (FR)

(72) Inventors: Céline Croutxe-Barghorn, Rantzwiller (FR); Abraham Chemtob, Mulhouse (FR); Lingli Ni, Zhejiang (CN); Nadia Moreau, Ploeren (FR); Thierry Bouder, Arradon (FR)

(73) Assignees: UNIVERSITE DE HAUTE-ALSACE, Mulhouse (FR); SOCOMORE, Vannes (FR)

( * ) Notice: Subject to any disclaimer, the term of this patent is extended or adjusted under 35 U.S.C. 154(b) by 0 days.

(21) Appl. No.: 14/401,245

(22) PCT Filed: May 16, 2013

(86) PCT No.: PCT/IB2013/001306
§ 371 (c)(1),
(2) Date: Nov. 14, 2014

(87) PCT Pub. No.: WO2013/171579
PCT Pub. Date: Nov. 21, 2013

(65) Prior Publication Data
US 2015/0133576 A1 May 14, 2015

Related U.S. Application Data

(60) Provisional application No. 61/647,725, filed on May 16, 2012.

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 135/02* | (2006.01) | |
| *C09D 4/00* | (2006.01) | |
| *C09D 183/00* | (2006.01) | |
| *C09D 183/06* | (2006.01) | |
| *C08G 77/14* | (2006.01) | |

(52) U.S. Cl.
CPC ............ *C09D 135/02* (2013.01); *C09D 4/00* (2013.01); *C09D 183/00* (2013.01); *C09D 183/06* (2013.01); *C08G 77/14* (2013.01)

(58) Field of Classification Search
CPC ...................................... C09D 135/02
USPC ......... 522/15, 12, 7, 6, 71, 189, 184, 1, 8, 68, 522/13, 21, 22; 520/1
See application file for complete search history.

(56) References Cited

U.S. PATENT DOCUMENTS

| 4,101,513 A | 7/1978 | Fox | |
|---|---|---|---|
| 4,426,431 A * | 1/1984 | Harasta | C09D 4/06 106/287.14 |
| 2009/0318578 A1 | 12/2009 | Versteeg | |
| 2011/0060068 A1 | 3/2011 | Spyrou | |

FOREIGN PATENT DOCUMENTS

| KR | 2003-0043535 A | 6/2003 |
|---|---|---|
| KR | 10-2011-0025634 A | 3/2011 |
| WO | 2007/003828 A2 | 1/2007 |
| WO | 2010/112481 A1 | 10/2010 |

OTHER PUBLICATIONS

International Search Report issued in Application No. PCT/IB2013/001306 dated Oct. 7, 2013.

* cited by examiner

*Primary Examiner* — Ling Choi
*Assistant Examiner* — Jessica E Whiteley
(74) *Attorney, Agent, or Firm* — Pearne & Gordon LLP

(57) ABSTRACT

Radiation curable composition for preparing a hybrid sol-gel layer on a surface of a substrate, wherein said composition comprises at least one radically radiation curable material; at least one non-reactive organofunctional silane; at least one reactive organofunctional silane; at least one cationic photo-initiator; and at least one radical photoinitiator.

Method for preparing a hybrid sol-gel layer on a surface of a substrate using said composition and hybrid sol-gel layer so prepared.

Substrate comprising at least one surface coated with said hybrid sol-gel layer.

24 Claims, No Drawings

RADIATION RADICALLY AND CATIONICALLY CURABLE COMPOSITION, AND METHOD FOR PREPARING A HYBRID SOL-GEL LAYER ON A SURFACE OF A SUBSTRATE USING SAID COMPOSITION

FIELD OF THE INVENTION

The invention relates to a radiation curable composition for preparing a hybrid sol-gel layer on a surface of a substrate, more particularly on a surface of a substrate comprising a metal, and/or a metal alloy and/or, a composite material, preferably on a surface of a substrate composed of a metal, and/or a metal alloy, and/or a composite material. Preferably, the metal is aluminium, and the alloy is an aluminium alloy.

The invention is further related to a method for preparing a hybrid sol-gel layer on a surface of a substrate using said composition.

The technical field of the invention may be defined, generally speaking, as being that of the treatment of surfaces, especially of surfaces made of metals or of metal alloys, in particular the coating of surfaces made, of metals, such as aluminium or titanium, or of metal alloys such as steels, that are used e.g. in the aerospace, automotive, shipbuilding, oil and gas transportation, wind and sea energy production, and drilling industries, for making e.g. cars, ships, aircrafts, pipelines, and offshore platforms.

More specifically, the invention belongs to the technical field of protection surface coatings, known as hybrid sol-gel surface coatings, used to coat the surface of substrates made, for example, of metals or of metal alloys, and to protect said surface against aggressive environments such as corrosive atmospheres, and chemical and/or mechanical stresses.

Said hybrid sol-gel surface coatings can for example impart resistance to solvents, fuels, and hydraulic fluids, and resistance to impacts and abrasion.

Said hybrid sol gel coatings can replace protective and/or decorative organic coating layers, such as conversion layers, primer layers, paint layers, or complete paint systems used on substrates made for example of metals, of metal alloys, or of composite materials.

BACKGROUND OF THE INVENTION

Conversion treatments lead to a superficial structural modification of the metal substrate (e.g. alloys of aluminium, titanium and other metals) by an anodisation process (an operation of electrolysis, for example chromic, sulphuric or phosphoric anodic oxidation) or by a simple chemical conversion process (for example, chromatizing or phosphatizing).

Said treatments allow a highly adherent layer of oxide (or hydroxide) to be grown, at the expense of the base metal, said layer being placed in an anode situation. On aluminium alloys, in particular, the baths of chromic acid lead to the formation of a fine (several microns) layer which is porous and exhibits a good capacity for the adhesive bonding of organic coatings.

Among the chemical conversion processes, chromatizing allows the formation of a highly adherent, thin deposit of metal chromates, by contacting the surface of the component to be treated (typically alloys of aluminium, zinc or steels) with an acidic solution based on dichromates and fluorine-containing activators. This treatment enhances the corrosion resistance of the substrate and is also used as a tie base for paints.

Because they use strong acids or bases and toxic materials such as chromates in immersion tanks, these surface treatment processes exhibit many disadvantages, particularly with regard to their harmful influence on the environment.

Other drawbacks of said surface treatment processes is the high amount of energy needed for their heating and maintenance and the fact that their use is limited to elementary parts.

Moreover, these processes require substantial amounts of water for rinsing the excess treatment solutions away from the treated components; the rinsing water and the spent process solutions must be treated in order to remove the dissolved metals, before they are disposed of or re-used; the removal of the metals produces additional toxic waste, which is difficult to purify and to dispose of.

The entirety of these treatments, subsequent to the implementation of the processes, increases the cost of use of the conventional wet-chemical processes.

Similarly, components treated at the end of their life, or in renovation phases, give rise to toxic waste which is prejudicial for the users.

Recently much stricter legislations have mandated in Europe and in the US for the progressive reduction and finally removal of the environmentally hazardous compounds, especially chromate species, making therefore urgent the need for the development of non-chromate coatings.

Consequently processes have been proposed which employ the sol-gel coating technique in order to overcome the disadvantages of the aforementioned wet-chemical processes and especially of the processes involving chromates.

Among the various techniques developed, sol-gel process is considered to be one of the most promising alternative methods to conventional chromate treatment. There are a lot of advantages inherent to the sol-gel process. First, sol-gel technology provides a low temperature chromate-free route for the preparation of coatings that are applicable to most of metallic substrates; further, the properties of sol-gel coatings can be controlled by various synthesis parameters; at last, it is possible to introduce a wide range of functional additives into the formulation, thus enabling to adjust the physical and chemical properties and to impart specific functionalities to the coatings.

Historically, the first type of sol-gel corrosion protection coatings is inorganic oxide sol-gel derived films. Various sol-gel oxide films such as $SiO_2$, $ZrO_2$, $CeO_2$, $SiO_2/Al_2O_3$ and $SiO_2/TiO_2$ etc. have been extensively studied to impart corrosion protection to various metallic substrates.

However, there are some limitations to said inorganic oxide sol-gel derived films due to the inorganic character of the material.

For instance, limited coating thickness owing to the crackability undermined the protection performance which restricted the applications in the aerospace industry.

To overcome those limitations, an attractive solution is to introduce an additional organic component into the inorganic sol-gel network to form a hybrid organic inorganic coating via a conventional sol-gel polymerization process using organometallic precursor compound.

Such hybrid sol-gel coatings combine the advantages of both organic and inorganic coatings.

An example of a formulation that can be used to prepare hybrid sol-gel coatings is the product known as "Boegel" developed by Boeing.

"Boegel" is a water basis diluted sol comprising GlycidyloxyPropylTriMethoxySilane (GPTMS) and Zirconium Tetrapropoxide (TPOZ) as main components, which can form a thin hybrid coating deposited on an aluminium alloy surface.

The hybrid sol-gel coatings prepared from said diluted sol intrinsically has limited anticorrosion properties.

The corrosion resistance is not provided by the sol gel coating itself but by the combination of the sol-gel coating-acting as adhesion promoter—with the paint systems.

Moreover, the methods for producing hybrid sol-gel coatings from said diluted sol involve several steps including the sol preparation and hydrolysis reaction.

Finally said sol has a limited pot life.

Some improvements to said hybrid organic inorganic sol-gel coatings are described in WO-A2-2007/003828 which discloses a concentrated sol, free of any noxious solvent and allowing the preparation of sol-gel coatings having an increased dry thickness, and a better corrosion resistance.

However, to obtain such a corrosion resistance, assessed by the neutral salt spray test, drying at a temperature above 60° C., preferably above 80° C., more preferably above 100° C. is absolutely required.

Moreover, the corrosion resistance, as assessed by the Salt Spray Test of the sol gel coatings produced in WO-A2-2007/003828 is only of about 168 hours.

On the other hand, recently, UV curing technology has been combined with hybrid sol-gel material with many advantages such as low energy consumption, high reactivity, solvent-free technology, and stability of the formulations when not exposed to UV light.

The UV technology, combined with the introduction of an inorganic phase at the nanoscale, has given birth to a variety of novel UV cured hybrid materials but the photopolymerization was generally limited to the organic part.

Interestingly, UV irradiation was also proved to be suitable to induce a sol-gel reaction through the catalysis of photoacids produced by the photolysis of onium salts Thus, U.S. Pat. No. 4,101,513 discloses onium salts that are radiation activable catalysts for the hydrolysis of alkoxysilanes. Anhydrous compositions comprising said silanes and said catalysts are storage stable. This opens up perspective for the replacement of conventional thermal curing sol-gel process by a photoinduced sol-gel process catalysed by photoacid.

The super acids produced by photolysis of onium salts are also well-known photoinitiators of cationic photopolymerization. US-A1-2009/0318578 discloses an ultraviolet-curable coating composition comprising (A) at least one silane having a hydrolysable group and at least one group containing a cyclic ether; (B) at least one material containing one or more cyclic ether groups; which is not an alkoxysilane and is different from the silane (A); and (C) a cationic photoinitiator. In other words, the compositions of said document combine the cationic cure capability of cyclic ethers and other cationic curing materials with the cationic induced hydrolysis and subsequent condensation typical of alkoxysilanes.

Although the coatings prepared using said compositions exhibit some corrosion resistance, said resistance is actually very limited.

In addition, said patent application is silent on the mechanical properties and solvent resistance of the coatings prepared using said compositions.

US-A1-2011/0060068 discloses radiation-curable, free-radically crosslinkable formulations comprising at least one alkoxysilane and at least one acid-generating photoinitiator.

In the same way as the compositions of US-A1-2009/0318578 mentioned above, although the coatings prepared using the compositions of US-A1-2011/0060068 exhibit some corrosion resistance, said resistance is actually very limited.

In addition, said patent application is again silent on the mechanical properties and solvent resistance of the coatings prepared using said compositions.

Overall, in the methods, such as the method disclosed in US-A1-2009/0318578, involving photo sol-gel polymerization, the photolysis of a cationic photoinitiator such as a diaryl iodonium salt generates a photoacid (superacid) which then catalyzes both the cationic polymerization of a cationically radiation polymerizable resin and the sol gel polymerization of silanes precursors in the presence of water (moisture) present in the ambient atmosphere.

Hybrid sol gel films are therefore obtained.

Said methods have some advantages such as:

Single step processes (liquid precursor based film to cross-linked film);

Rapid reaction;

No water addition because hydrolysis of the silane precursors relies simply on moisture diffusion from ambient air;

1-K stable formulations until exposed to UV light;

Easy to perform.

However, although the coatings prepared using the above formulations provide some corrosion protection on steel. There still exists a need for a solvent free, 1-K, coating having improved, very good anti-corrosion properties and also having good mechanical and solvent resistance properties.

In the light of the above, therefore, there exists a need for a radiation curable composition for preparing a hybrid sol-gel layer on a surface of a substrate, for example of a metal surface, that makes it possible to prepare a hybrid sol-gel layer that has an enhanced and high corrosion resistance as defined in particular by the salt-spray treatment test and that has also good mechanical properties and good solvent resistance.

In other words, and contrary to the known radiation curable composition for preparing a hybrid sol-gel layer, an huge enhancement to the corrosion protection of metals including neutral salt spray and filiform corrosion must be achieved without detriment to the other properties of the hybrid sol-gel coating, including, the mechanical resistance such as the scratch resistance, and wear resistance, the chemical resistance such as the solvent and hydraulic fluids.

There also exists a need for a radiation curable composition which has a low or zero solvent content, particularly in terms of noxious or toxic solvents, and in terms of other compounds that might have an adverse influence on the environment.

There exists, finally, a need for a process for preparing a 1K, solvent free hybrid sol-gel coating on a surface, for example a metal surface, that is simple, reliable, easy to carry out, which comprises a limited number of steps and treatments or coats to apply, and which can easily be integrated into the existing processes, so as to reduce workers exposures and application cycles for surface treatment of metal or composite surfaces.

The goal of the invention is to provide a radiation curable composition for preparing a radiation curable hybrid sol-gel layer on a surface of a substrate, for example of a surface comprising a metal, and a method for preparing a hybrid sol-gel layer on a surface, for example a surface comprising a metal or a metal alloy, that uses said composition, which meet the needs set out above, among others, and which satisfy the criteria and requirements mentioned earlier on above.

A further goal of the invention is to provide to provide a radiation curable composition for preparing a hybrid sol-gel layer on a surface of a substrate, for example of a surface comprising a metal, and a method for preparing a hybrid sol-gel layer on a surface, for example a surface comprising a metal or a metal alloy, that do not exhibit the disadvantages, defects, limitations and drawbacks of the prior-art compositions and methods, and which solve the problems of the compositions and methods of the prior art.

SUMMARY OF THE INVENTION

This goal and still other goals are achieved, according to the invention by a radiation curable composition for preparing a hybrid sol-gel layer on a surface of a substrate, wherein said composition comprises:

a) at least one radiation curable (i.e. polymerizable and/or crosslinkable) material capable of being polymerized and/or crosslinked by a radical polymerization reaction upon exposure to a radiation such as a light (also called a free radically radiation curable i.e. polymerizable and/or crosslinkable material, e.g. resin, or radiation curable radical material e.g. resin), said radiation curable material comprising at least two radically polymerizable functional groups;

b) at least one organofunctional silane of formula (I):

in which:
m is a number between 1 and 3, preferably m is 3;
OR' is an hydrolysable group; and
R is a hydrocarbyl group optionally containing at least one heteroatom, selected from among oxygen, and nitrogen atoms;

c) at least one organofunctional silane of formula (II):

in which:
m is a number between 1 and 3, preferably m is 3;
OR' is an hydrolysable group; and
$R^1$ is a hydrocarbyl group optionally containing at least one heteroatom, selected from among oxygen, and nitrogen atoms, and comprising at least one, and preferably one radically polymerizable functional group capable of polymerizing with one of the radically polymerizable functional group of the radiation-curable material;

d) At least one cationic photoinitiator; and
e) At least one radical photoinitiator.

Advantageously, the total concentration of the radiation curable material(s), of the silane(s) of formula (I), and of the silane(s) of formula (II) may be generally from 5% to 99.8% by weight, preferably from 10% to 99.4% by weight, preferably from 25% to 98.5% or 99% by weight, preferably from 30% to 97.5% by weight, preferably from 40% to 95% by weight, preferably from 48% or 50% to 95% by weight, preferably from 58% to 94.5% by weight, preferably from 59% to 91% by weight preferably from 60% to 90% by weight, preferably from 70% to 80% by weight of the total weight of the radiation curable composition.

Specific ranges of said total concentration of the radiation curable material(s), of the silane(s) of formula (I), and of the silane(s) of formula (II) are 80% to 99.4% by weight, 90% to 99% by weight, 94% to 98.5% by weight of the total weight of the radiation curable composition.

Specific values of said total concentration of the radiation curable material(s), of the silane(s) of formula (I), and of the silane(s) of formula (II) are 92.1% by weight, 96.5% by weight, 88.1% and 88% by weight of the total weight of the radiation curable composition.

The amounts, concentrations, of cationic photoinitiator and of radical photoinitiator are specified hereinbelow.

The total amount, concentration, by weight of all the components of the composition is of course 100% by weight.

The man skilled in the art knows how to adjust, especially within the concentration ranges provided herein, the total concentration of the radiation curable material(s) of the silane(s) of formula (I), and of the silane(s) of formula (II), the concentration of the cationic photoinitiator, the concentration of the radical photoinitiator; and the concentration of the other optional agents of the composition recited below, to reach 100% by weight.

The hydrocarbyl groups may be any kind of hydrocarbyl group comprising C and H atoms and may include e.g. alkyl groups, cycloalkyl groups, alkenyl groups, cycloalkenyl groups, aromatic groups; and may be linear or branched.

The organosilane of Formula (II), also simply called silane of formula (II) may be defined as a reactive silane i.e. a silane bearing an organic reactive group, and the organosilane of formula (I) also simply called silane of formula (I) may be defined as a non-reactive silane i.e. a silane that does not bear any organic reactive group.

Preferably, the silane of formula (I) is an organo mono (trialkoxysilane) in which:
R' is a linear or branched alkyl group having 1 to 6C atoms, preferably R' is a methyl or ethyl group, and
R is a linear or branched alkyl group having 1 to 20C atoms, preferably 4 to 16C atoms, more preferably from 8 to 12C atoms optionally interrupted by at least one heteroatom, selected from among oxygen, and nitrogen atoms; a cycloalkyl group having 3 to 20C atoms, for example 6C atoms (cyclohexyl); an aryl group having 3 to 20C atoms such as a phenyl group; an alkyl (1 to 20C)-aryl (3 to 20C) group; or an aryl (3 to 20C)-alkyl(1 to 20C) group; and R being optionally substituted by one or more substituent selected from the group consisting of halogen atoms, and amino groups ($NH_2$).

All the alkyl groups may be linear or branched.

In particular, the alkyl or cycloalkyl group of R may be perfluorinated. Preferably, the silane of formula (II) is an organo mono (trialkoxysilane) in which:
R' is a linear or branched alkyl group having 1 to 6C atoms, preferably R' is a methyl or ethyl group, and
$R^1$ is a linear or branched alkyl group having 1 to 20C atoms, preferably 4 to 16C atoms, more preferably from 8 to 12C atoms, optionally interrupted by at least one heteroatom, selected from among oxygen, and nitrogen atoms; a cycloalkyl group having 3 to 20C atoms, for example 6C atoms (cyclohexyl); an aryl group having 3 to 20C atoms such as a phenyl group; an alkyl (1 to 20C)-aryl (3 to 20C) group; or an aryl (3 to 20C)-alkyl(1 to 20C) group; Fe comprising (carrying) at least one radically polymerizable functional group capable of polymerizing with one of the radically polymerizable functional group of the radiation-curable material, and Fe being optionally substituted by one or more substituent(s) selected from the group consisting of halogen atoms and amino groups.

All the alkyl groups may be linear or branched.

Advantageously, the radically polymerizable functional groups of the radiation curable resin and of the silane of formula (II) are selected from among the group consisting of acrylate, methacrylate, vinyl, and thiol, functional groups.

The radically polymerizable functional groups of the radiation curable resin and of the silane of formula (II) may be the same or different.

The radiation curable material is different from the silanes (I) and (II) and is not a silane. The silane (I) is different from the silane (II).

Like the curable compositions of the prior art, the curable compositions according to the invention are liquid at ambient temperature and are organic solvent-free and water-free-.

By solvent-free (or water free) is generally meant that the curable composition comprises less than 5% by weight organic solvent (water), preferably less than 1% by weight solvent (water) of the total weight of the composition, more preferably 0% by weight organic solvent (water).

The curable compositions of the invention have therefore the advantages of being 1-K, coloured or not, pigmented or not, solvent free and water free formulations, that are stable over a long period of time, for example of at least 6 months, and preferably at least one year, until exposed to a radiation such as UV light.

The compositions according to the invention are stable over a long period of time, i.e. they do not exhibit any deterioration of their properties over a period of time for example of at least 6 months, and preferably at least one year.

The curable compositions according to the invention are fundamentally different from the composition of the prior art in that they comprise:
 a radiation curable material which is specifically a radical radiation-curable i.e. polymerizable and/or crosslinkable material such as a resin,
 a specific combination of a non-reactive silane of formula (I) and of a reactive silane of formula (II), i.e. the silane of formula (I) is not used alone, and
 both a cationic photoinitiator and a radical photoinitiator.

Such a combination of a radiation curable material such as a resin, which is specifically a radiation curable radical material such as a resin, said material being in turn combined with a specific combination of a non-reactive silane of formula (I) and of a reactive silane of (II), and with both a both a cationic photoinitiator, and a radical photoinitiator is not disclosed nor suggested in the prior art as represented e.g. by the documents cited hereinabove.

The hybrid sol-gel layers prepared on a surface of a substrate, especially a metal substrate, by using the curable composition according to the invention surprisingly have a unique combination of beneficial properties that was never obtained heretofore by using the curable compositions according to the prior art which do not contain a combination of a radiation curable material which is specifically a radiation curable radical material, said material being in turn combined with a specific combination of a non-reactive silane of formula (I) and of a reactive silane of (II), i.e. the silane of Formula (I) is not used alone, and with both a cationic photoinitiator and a radical photoinitiator.

The hybrid sol-gel layers prepared on a surface of a substrate, especially a metal substrate, by using the curable composition according to the invention surprisingly have at the same time outstanding properties of adhesion, corrosion resistance, and chemical resistance, especially solvent resistance, and also outstanding mechanical properties.

In other words, contrary to the curing compositions of the prior art, the hybrid sol-gel layers prepared on a surface of a substrate by using the curable compositions according to the invention have an outstanding corrosion resistance, and also have, surprisingly, unlike the hybrid sol gel layers of the prior art, outstanding mechanical properties, adhesion properties and excellent chemical resistance, especially solvent resistance.

Specifically, the hybrid sol-gel layers prepared on a surface of a substrate, especially a metal substrate, e.g. an aluminium or aluminium alloy substrate, by using the curable composition according to the invention provide a corrosion resistance in the neutral spray test, according to NF EN ISO 9227:2007 standard greater than 1000 hours, preferably greater than 2000 hours and more preferably greater than 3000 hours; and the hybrid sol-gel layers prepared on a surface of a substrate, especially a metal substrate, e.g. an aluminium or aluminium alloy (such as a 2024 T3 aluminium alloy) substrate, by using the curable composition according to the invention also have, at the same time a solvent resistance determined according to ISO 2812-1:1993 standard greater than 2 hours, preferably greater than 24 hours.

The hybrid sol-gel layers prepared on a surface of a substrate, especially a metal substrate, e.g. an aluminium or aluminium alloy substrate, by using the curable composition according to the invention also have good adhesion properties as demonstrated by the fact that they pass the Cross-cut test according to ISO 2409:2003 standard.

The material making up the hybrid sol-gel layer prepared by curing the curable composition of the invention comprises an organic tridimensional network resulting from the radical polymerization and crosslinking of the radically polymerizable functional groups of the radiation curable material and of the radically polymerizable functional groups of the silane of formula (II) (i.e. the organic reactive part of the reactive silane (II) copolymerizes with the radiation curable material), and a tridimensional inorganic network resulting from the sol-gel polymerization of the silane of formula (I) with the silane of formula (II).

The radical polymerization is initiated by the radical photoinitiator whereas the sol-gel polymerization is initiated by the cationic photoinitiator.

All the polymerization reactions e.g. photopolymerization reactions take place at the same time i.e. proceed simultaneously.

In the resulting material, the organic network and the inorganic network are interpenetrated, intermingled. Moreover, there are covalent bonds between the organic and inorganic networks. Said covalent bonds are created by reaction between the radically polymerizable functional groups of the radiation curable resin and of the radically polymerizable functional groups of the silane of formula (II).

Without wishing to be bound by any theory, the corrosion resistance is imparted to said material making up the hybrid sol-gel layer by the silane of formula (I), especially the hydrocarbyl group, e.g. alkyl groups thereof.

However when the inorganic sol-gel network is based only on such silanes, the solvent resistance and mechanical resistance of the layer are poor.

According to the invention the strengths of both the organic and inorganic networks are increased by the addition of a "coupling agent" such as the silane or formula (II). The global crosslinking density of the material is globally increased.

Preferably, the concentration of the radiation curable material such as a resin is from 10% to 50% by weight, preferably from 20% to 40% by weight, more preferably from 25% to 35% by weight of the total weight of the radiation curable material, the silane of formula (I) and the silane of formula (II); the concentration of the silane of formula (I) (e.g. the organo monotri(alkoxysilane)) is from 10% to 50% by weight, preferably from 20% to 40% by weight, more preferably from 25% to 35% by weight, of the total weight of the radiation curable material, the silane of formula (I) and the silane of formula (II); and the concentration of the silane of formula (II) is from 10% to 50% by weight, preferably from 20% to 40% by weight, more preferably from 25% to 35% by weight of the total weight of the radiation curable material, the silane of formula (I) and the silane of formula (II).

Another advantage of the compositions according to the invention is that they make it possible, to obtain dry, cured, hybrid sol-gel films having a high thickness ranging generally from 1 to 80 μm or even more, depending on the formulation, preferably from 5 to 45 μm, more preferably from 10 μm to 30 μm.

This thickness is obtained in a single layer by a single step deposition, by techniques such as bar coating, roll coating, dipping, sprinkling or spraying.

The compositions according to the invention are not applied using baths, thus saving, energy, water and maintenance. This is also one of the reasons why the compositions of the invention can be used not only to prepare and coat elementary parts but also assembled parts (e.g. wings, aircrafts) that may have large sizes and/or complex shapes.

Films of this kind can only be prepared with most of the prior-art sols or compositions by successive surface treatments and/or depositions of two or more layers and in a plurality of operations of application.

Moreover, the films prepared from the curable compositions according to the invention are of excellent quality and in particular have a regular thickness, without sags.

By virtue, in particular of the increase in the dry thickness deposited per layer, which ranges, for example, from 1 to 80 μm or more, the intrinsic corrosion protection performance of the cured films, layers, obtained from the compositions according to the invention is significantly improved relative to that of the sol-gel and hybrid sol-gel films, layers, obtained from the prior-art sols.

Excellent results are also obtained for filiform corrosion.

In other words, it is demonstrated that the film, layer, according to the invention achieves corrosion protection which is provided by a barrier layer effect due to the film, layer, on its own, and surprisingly does so in spite of the fact that, generally, no anti-corrosion agents are incorporated into the film, layer, according to the invention.

The level of corrosion protection obtained with the hybrid sol-gel film, layer, of the invention alone is achieved with one layer whose dry thickness is generally from 1 μm to 80 μm, preferably from 5 μm to 45 μm, more preferably from 10 μm to 30 μm on a wide variety of supports, —such as for example aluminium, titanium, stainless steel, composite materials, plastics, glasses, and so on—which may have been pretreated.

Thus, the compositions according to the invention can be used not only to prepare hybrid sol-gel coatings which are substituted for chromate conversion coatings, but they can also be used to prepare hybrid sol-gel primers, hybrid sol-gel paints, and hybrid sol-gel coatings for specific applications as a monocoat for Direct-To-Metal (DTM) coatings which have very high corrosion and protection properties for general industry purposes.

By radiation curable material is meant a material that can be radiation, generally light (e.g. UV light) polymerized and/or crosslinked, i.e. a material that is radiation polymerizable and/or crosslinkable.

Said radiation curable material comprises at least two radically polymerizable functional groups.

Preferably, said material comprises from 2 to 5 polymerizable functional groups, e.g. 2, 3, 4, or 5 polymerizable functional groups, more preferably 2 functional groups, and preferably the silane of formula (II) comprises 1 to 4 polymerizable functional group, e.g. 1, 2, 3, or 4 polymerizable functional groups, preferably one polymerizable functional group.

As already stated above, said radically polymerizable functional groups may be selected from the group consisting of acrylate, methacrylate, vinyl, and thiol, functional groups.

Said radiation curable material is usually called a resin, and may be a polymer, oligomer, or pre-polymer.

The radiation-curable, i.e. polymerizable and crosslinkable, material such as a resin, may therefore be selected from the group consisting of (standard) acrylate-, methacrylate-, vinyl-, or thiol-terminated materials.

By acrylate-, methacrylate-, vinyl-, or thiol-terminated materials is generally meant that each reactive group of said material is an acrylate, methacrylate, vinyl, or thiol functional group.

Advantageously, the radiation curable resin is selected from among the group consisting of ethoxylated bisphenol A dimethacrylate, 1,6-hexanediol dimethacrylate, 1,12-dodecanediol dimethacrylate, 1,10-decanediol diacrylate, tricyclodecanedimethanol dimethacrylate, bisphenol A epoxy methacrylate, tripropyleneglycol diacrylate, acrylate or methacrylate oligomers such the products known under the names SB500E50, Rokracure® VP 5550, Rokracure® VP5762SR802, Ebecryl® 171, Laromer® LR9013, Ebecryl® 3416, Ebecryl® 110, Ebecryl® 3300, and mixtures thereof.

The silane of formula (I), for example the organo mono (trialkoxysilane) of formula (I), may be selected from among the group consisting of phenyl trimethoxysilane (Phenyl TMS), cyclohexyl trimethoxysilane (Cyclohexyl TMS), iso-butyl trimethoxysilane (Iso-Butyl TMS), iso-octyl trimethoxysilane (Iso-Octyl TMS), linear alkyl (1 to 20C) trimethoxysilanes ($C_n$TMS), preferably linear alkyl (1 to 8C) trimethoxysilanes ($C_n$TMS with $1 \leq n \leq 12$ preferably $4 \leq n \leq 8$), 3-aminopropyl trimethoxysilane, and mixtures thereof; preferably, the organo mono (trialkoxy silane) may be selected from among the group consisting of iso-octyl trimethoxysilane, linear alkyl (4 to 8C) trimethoxysilanes ($C_4$TMS to $C_8$TMS), and mixtures thereof.

It has been shown that an optimal corrosion protection is obtained when using $C_8$TMS.

The silane of formula (II), for example the organo mono (trialkoxysilane) of formula (II), comprises at least one radically polymerizable functional group, preferably from 1 to 4 radically polymerizable functional group, e.g. 1, 2, 3, or 4 radically polymerizable functional groups, more preferably one radically polymerizable functional group.

Said silane, for example organo mono (trialkoxysilane) of formula (II) may be selected from the silanes, for example organo mono (trialkoxysilane) of formula (I), recited above, with the proviso that Fe comprises at least one radically polymerizable functional group, preferable one radically polymerizable group selected preferably from among acrylate, methacrylate, vinyl and thiol radically polymerizable functional groups.

Said radiation polymerizable group(s) is (are) selected preferably from among acrylate, methacrylate, vinyl and thiol radically polymerizable functional groups. Preferably, the silane for example organo mono (trialkoxysilane) of formula (II) is chosen from among: 3-methacryloxypropyltrimethoxysilane (MAPTMS), 3-(trimethoxysilyl) propyl acrylate (APTMS), 3-mercaptopropyl trimethoxysilane, vinyltrimethoxysilane and mixtures thereof.

The relative proportion by weight of the (non-reactive) silane of formula (I) to the silane of formula (II) may be from 50% by weight to 150% by weight, preferably from 80% by weight to 120% by weight, more preferably said proportion may be 100% by weight.

The concentration of the cationic photoinitiator may be from 0.5% to 10% by weight, preferably from 0.5% to 5% by weight, more preferably from 0.75% to 3% by weight of the total weight of the composition.

The cationic photoinitiator may be selected from among the group consisting of onium salts, organometallic complexes, and non-ionic photoacids.

The onium salts may be selected from among the group consisting of diaryliodonium salts and derivatives thereof, triarylsulfonium salts and derivatives thereof, and mixtures thereof. Said onium salts have preferably hexafluoroantimonate, hexafluorophosphate or tetrafluoroborate anions. Preferably the onium salts may be selected from among the group consisting of (4-methylphenyl)[4-(2-methylpropyl)phenyl]iodonium hexafluorophosphate, Bis-(4-methyl-phenyl)iodonium hexafluorophosphate), Bis(dodecyl phenyl) iodonium hexafluorophosphate, 9-(4-hydroxyethoxyphenyl) thianthrenium hexafluorophosphate, diphenyl iodonium triflate, and mixtures thereof.

The organometallic complexes may be selected from among metallocenium salts, preferably from among ferrocenium salts such as cyclopentadienylcumen-iron hexafluorophosphate.

The non-ionic photoacids may be selected from among the group consisting of alkyl/aryl sulfonic acid, fluorinated sulfonic acids, sulfonimides, tetra-aryl boronic acids, and mixtures thereof.

Examples of such non-ionic photo acids are the products known under the commercial names of PAG 103 and PAG 121.

The cationic photoinitiator may be combined with a sensitizer.

When the composition is a composition containing a high amount of pigment(s), for example from 10% to 50% by weight, preferably from 20% to 30% by weight of the total weight of the composition, then cationic photoinitiators such as substituted triarylsulfonium salts should be used.

Absorption into longer wavelength may be obtained by sensitization with sensitizers such as thioxanthones or anthracenes.

Such compositions, and especially the compositions containing a high amount of pigments, may be used to prepare "DTM" i.e. Direct To Metal coatings comprising a single hybrid sol-gel layer according to the invention directly deposited on a metal or metal alloy surface.

The concentration of the radical photoinitiator may be from 0.1% to 10% by weight, preferably from 0.5% to 5% by weight, more preferably from 0.75% to 3% by weight of the total weight of the composition.

The radical photoinitiator may be selected from among type I photoinitiators consisting of hydroxyacetophenones, alkylaminoacetophenones, benzyl ketals and dialkoxyacetophenones, benzoin ethers, phosphine oxides, preferably x-hydroxyketones or derivatives thereof and more preferably 2-hydroxy-2-methyl-1-phenyl-propan-1-one, phenyl bis (2,4,6-trimethylbenzoyl)phosphine oxide), 2-benzoylpropan-2-one, and mixtures thereof.

A most preferred radical photoinitiator is 2-hydroxy-2-methyl-1-phenyl-propan-1-one.

When the composition is a composition containing a high amount of pigment(s), for example from 10% to 50%, preferably from 20% to 30% by weight of the total weight of the composition, then specific type II radical photoinitiating systems based on photoinitiators capable to abstract electron or hydrogen from their excited states, such as benzophenone, thioxanthone, anthraquinone and camphorquinone and derivatives thereof are used.

Compounds capable to donate an electron or hydrogen are co-initiators such as amines, thiols, alcohol, borate salts and have generally to be used.

Such compositions and especially the compositions containing a high amount of pigments may be used to prepare "DTM", i.e. Direct to Metal coatings comprising a single hybrid sol-gel layer according to the invention directly deposited on a metal or metal alloy surface.

The composition according to the invention may further comprise at least one corrosion inhibitor. However it should be pointed out that, surprisingly, an outstanding corrosion resistance is obtained even in the absence of any corrosion inhibitor in the composition of the invention.

There is not any limitation on the corrosion inhibitors that may be used in the compositions according to the invention.

Any of the corrosion inhibitors known in the literature may be used in the compositions according to the invention.

Said corrosion inhibitor may be selected from among corrosion inhibitors in the form of pigments (i.e. pigments that also have a corrosion inhibition action or corrosion inhibiting pigments), organic salts, and mixtures thereof.

Preferably, said corrosion inhibitor may be selected from among the group consisting of praseodymium (Ill) oxide, calcium ion-exchanged synthetic amorphous silica, strontium aluminium polyphosphate hydrate, barium sulfate, zinc nitroisophtalate, antimony tin oxide, organophilized calcium strontium phosphosilicate, organophilized zinc phosphate, zinc molybdate, modified aluminium polyphosphate, molybdenum nanoparticles, β-cyclodextrine, 2-mercaptobenzothiazole, and mixtures thereof; more preferably the corrosion inhibitor may be selected from among the group consisting of Praseodymium(III) oxide, calcium ion-exchanged synthetic amorphous silica, strontium aluminium polyphosphate hydrate, and mixtures thereof. The concentration of the corrosion inhibitor may be from 1% to 20% by weight, preferably from 5% to 10% by weight of the total weight of the composition.

The composition according to the invention may further comprise at least one wetting agent.

Said wetting agent may be present in an amount of from 0.03% and 5% by weight, preferably from 0.1% and 0.7% by weight.

The wetting agent may be selected from among silicon surface additives; preferably, the wetting agent is a polyether modified polydimethylsiloxane.

The composition according to the invention may further comprise at least one filler.

The composition according to the invention may further comprise at least one dye and/or pigment.

In a specific embodiment the invention is related to a composition for making a hybrid sol-gel layer on a substrate surface comprising a radiation curable radical resin and monosilylated alkoxysilanes, in the presence of at least one photoinitiator, characterized in that it comprises:

a) A radiation curable radical resin, preferably a (meth)acrylate resin, b) The combination of at least two monosilylated akoxysilanes; the first monosilylated alkoxysilane being an organo monosilylated trialkoxysilane of formula IA:

R' being a methyl or ethyl group,

R being a linear or branched alkyl chain, a cycloalkyl or a phenyl group, the second alkoxysilane being an organo monosilylated trialkoxysilane of formula IIA:

R' being a methyl or ethyl group, $R^1$ being a linear or branched alkyl chain, a cycloalkyl or a phenyl, $R^1$ carrying a (meth)acrylate function, c) A cationic photoinitiator and/or a radical photoinitiator.

A preferred composition, according to the invention, for preparing a hybrid sol-gel layer on a surface of a substrate comprises:

(i) 2 wt % 2-hydroxy-2-methyl-1-phenyl-propan-1-one;
(ii) 0.5 wt % (4-methylphenyl)[4-(2-methylpropyl)phenyl] iodonium Hexafluorophosphate;
(iii) 0.5 wt % wetting agent: polyether modified polydimethylsiloxane;
(iv) The remaining material being Ethoxylated Bisphenol A dimethacrylate, n-octyl trimethoxysilane, 3-methacryloxypropyltrimethoxysilane (MAPTMS) or 3-(trimethoxysilyl)propyl acrylate (APTMS) in equal proportions.

The invention further provides a method for preparing a hybrid sol-gel layer on a surface of a substrate wherein:

a curable composition as disclosed above is deposited on the surface to give a layer of the composition on the surface of the substrate;

said layer of the composition is cured by exposure to a radiation, preferably to UV light, and to ambient atmospheric humidity, whereby a hybrid sol-gel layer is obtained on the surface of the substrate.

Advantageously, in a single operation, a layer of the composition is deposited so as to give a hybrid sol-gel layer with a dry thickness from 1 µm to 80 µm, preferably from 5 to 45 µm, more preferably from 10 to 30 µm.

The curable composition may be deposited by any known deposition process, for example by bar coating, roll coating, spraying, sprinkling or dipping.

Preferably the composition is applied by spraying or roll coating in a very simple way similar to the application of a paint or varnish.

The method according to the invention exhibits all of the advantages resulting from the use of the curable composition according to the invention, as described above. In particular, the method according to the invention allows the preparation of layers with a high dry thickness, in a single step, in a single go (a single pass) to replace conversion layers and coats.

The result is a substantial gain in time. By way of example, a film with a thickness from 1 µm to 80 µm, preferably from 5 µm to 45 µm, more preferably from 10 µm to 30 µm can be applied in a way similar to the application of a varnish or paint but with a drying time of a few seconds instead of several hours for conventional primer and paint systems. That will permit to reduce drastically the production cycles.

Similarly, it is not necessary with the method of the invention to carry out trickling or prolonged sprinkling in the way described in certain prior-art documents in order to obtain the deposition of a layer of equal thickness.

The desired dry thickness of the layer deposited can easily be obtained by modifying, for example, the settings of the gun or guns, the type of gun, the number of these guns, and the application distance. A thick layer, having a thickness from 1 µm to 80 µm, preferably from 5 µm to 45 µm, and more preferably from 10 µm to 30 µm is obtained rapidly without prolonged contact or trickling. The thick layer obtained is of excellent quality, uniform, and without sags.

The method according to the invention is therefore simple, reliable, rapid and less costly than the prior-art processes.

The method for preparing and applying a hybrid sol-gel layer according to the invention can be easily integrated into a conventional, existing line which includes other treatments of the substrate before or after the preparation of the hybrid sol-gel layer, with substantial gains in productivity.

Curing of the applied layer is achieved without any heating simply by exposure to a radiation such as UV light, thus saving energy.

This is also one of the reasons why the compositions of the invention can be used not only to coat elementary parts but also assembled parts (e.g. wings, aircrafts) that may have large sizes and/or complex shapes. The composition applied to such assembled parts can be easily cured and dried by exposure to a radiation whereas such a curing and drying would not have been possible by heating.

Lastly, the method according to the invention is environmentally compatible and meets the most recent directives relating to environmental protection, owing to the fact that the curable composition is organic solvent free.

Advantageously, said surface is coated only with said hybrid sol-gel layer, preferably containing a dye and/or pigment, therefore forming a monocoat on said surface (no other coating layer being prepared on said surface and no other layer being prepared, deposited on said hybrid sol-gel layer), preferably the substrate is made of a metal or metal alloy and said monocoat is a so-called Direct to Metal Coating "DTM".

The invention is also related to a hybrid sol-gel layer prepared by the above method.

Said hybrid sol-gel layer generally has a solvent resistance determined according to ISO 2812-1:1993 standard of above 2 hours, preferably of above 24 hours and good adhesion properties as already mentioned hereinabove.

The invention is also related to a substrate comprising at least one surface coated with at least one such hybrid sol-gel layer as disclosed above.

Advantageously, said surface is coated only with said hybrid sol-gel layer (no other coating layer being present), preferably containing at least one dye and/or pigment.

In other words, preferably the hybrid sol-gel layer may be applied as mono-coat, colored or not, pigmented or not on the surface of the substrate.

In that case, said hybrid sol-gel layer may replace 2, 3 or even 4 layers or coats, for example, anodisation or conversion or chromate layers or coatings, anti-corrosion primers, and even decorative paint coatings.

In other words such a single hybrid sol-gel layer may be used alone as anti-corrosion, protective, and possibly decorative coatings.

Such a single hybrid sol-gel layer therefore forms a monocoat on the surface of the substrate, more preferably made of a metal or a metal alloy, said mono-coat is a so called Direct-To-Metal coating or DTM.

Said substrates may be, or may be part of, an aircraft, such as a plane, a seaplane, a flying boat, an helicopter; an aerospace vehicle; a marine vessel; an offshore platform; a motor vehicle such as a car.

The invention relates furthermore to the use of said hybrid sol-gel layer prepared by the method according to the invention for imparting corrosion resistance to a surface of a substrate, in particular to a surface of a substrate made of a material selected from metals such as aluminium, metal alloys such as aluminium alloys, and composite materials comprising a metal or a metal alloy.

Preferably, the substrate is made of aluminium or of an aluminium alloy and the hybrid sol-gel layer imparts a corrosion resistance to the surface in the salt spray test, according to NF EN ISO 9227:2007 standard, of above 1000 hours, preferably of above 2000 hours, and more preferably of above 3000 hours.

Advantageously, said surface is coated only with said (cured) hybrid sol-gel layer; in other words, said hybrid sol-gel layer is used alone, as a single layer (monocoat), on the surface.

In other words, said hybrid single sol-gel layer forms a so-called "monocoat" on said surface.

When said surface is a metal or metal alloy surface such a monocoat is called a "DTM" (Direct To Metal) coating.

Said "DTM" hybrid sol-gel coating provides very high corrosion and protection properties and possibly decorative properties (e.g. when the layer comprises a dye and/or pigment) to the substrate.

The reason for this is that it has been found that the hybrid sol-gel layer according to the invention, or prepared by the method according to the invention, makes it possible, surprisingly, alone, by itself—without any other layer such as a layer of primer or paint being used—to impart at the same time corrosion resistance, protection against chemical and scratch stress or/and decorative function to said surface such as a metal or metal alloy surface.

This makes it possible to avoid the deposition of further layers in addition to the hybrid sol gel layer, and results in saving money, time and weight, which is of particular interest, for example, in the aerospace field.

Finally, the method according to the invention is therefore simple, reliable, rapid and less costly than the prior-art methods because a single coating step and a single coat could replace several ones.

However, the invention further also provides a method for preparing a coating comprising two or more layers on a surface of a substrate, at least one of these layers being a hybrid sol-gel layer prepared by the method as described above.

In particular the invention additionally provides a method for preparing a coating comprising two or more layers on a surface of a substrate, wherein:

A first hybrid sol-gel layer is prepared on said surface; then
One or more other layer(s) (also called "overcoat(s)") is (are) applied to said hybrid sol-gel layer, said other layer(s) being selected, for example, from anti-corrosive primer, decorative paint, top coat, clear coat, sealant, adhesive, and resin layers.

Said layer or layers other than the first hybrid sol-gel layer may be applied to the hybrid sol-gel layer immediately after its preparation, i.e. immediately after the application and curing steps, or else said layer or layers may be applied to the hybrid sol-gel layer within a certain time after its preparation, for example a time of several days (e.g. 2, 3, 4, 5, 10) or months (e.g. 2, 3, 4, 5, 10), to ten years.

The reason for this is that, since the first hybrid sol-gel layer by itself possesses anti-corrosion properties, it is unnecessary to provide it with other layers straight away.

The hybrid sol-gel coating protects the substrate of any corrosion which could occur during the manufacturing cycle of elementary parts or of assembled parts such as a plane, before painting.

Moreover, due to its mechanical resistance, the hybrid sol-gel layer, film also protects the substrate from scratch.

In the case of local repairing operations, the curable composition according to the invention may be applied to the area to coat (repair) and then exposed to UV lamp.

An intermediate layer or "intercoat" may optionally be provided on the first hybrid sol-gel layer to tailor and optimise the compatibility of the hybrid sol-gel layer with the other layer(s), overcoat(s).

Thus, a reactive inter-coat may possibly be applied to the hybrid sol-gel layer to allow a good adhesion/wettability of the other layer(s) such as primers or paints coats even after a period of time more or less long between the sol gel cure and the subsequent overcoat by primers or paints systems. Said other layer(s) is (are) preferably hybrid sol-gel layer(s) prepared by the method according to the invention.

Thus, it is also possible to deposit two or more hybrid sol-gel layers so as to form a multi-layer coating, each layer having a composition different from the preceding layer and from the following layer, and each deposited layer exhibiting different properties, selected from the properties set out below.

Generally speaking, it is possible to deposit e.g. from 1 to 5 hybrid sol-gel layers, preferably from 2 to 3 hybrid sol-gel layers.

The coating may therefore comprise, preferably consist of, two or more identical or different hybrid sol-gel layers according to the invention selected, for example, from the hybrid sol-gel layers having the particular properties described later on below, and optionally one or more other layers selected, for example, from paint, primer, mastic, adhesive or resin layers.

The invention will be better understood from a reading of the detailed description below, which is given essentially in relation to the process of preparing a hybrid sol-gel layer on a surface of a substrate.

DETAILED DESCRIPTION OF THE INVENTION

This process first comprises the deposition on said surface of a curable composition for the purpose of obtaining a hybrid sol-gel layer on the surface of the substrate.

The substrate according to the invention may be any material capable of receiving a hybrid sol-gel layer. The process according to the invention is applied to very diverse materials with excellent results in terms of the properties of the resulting layer.

The substrate is generally made of a material selected from metals; metal alloys; organic or inorganic glasses; organic polymers such as plastics; wood; ceramics; textiles; concretes; papers; stone; carbon fibres and carbon fibres composites; and composite materials comprising two or more of the aforementioned materials; these materials being optionally plated and/or surface-treated and/or coated, for example painted.

The material of the substrate may in particular be selected from aluminium; titanium; copper; iron; magnesium; and alloys thereof, such as steels, for example stainless steels, aluminium alloys and Inconel; the surface of the substrate being optionally plated and/or surface-treated and/or coated, for example painted.

The aluminium alloys include the grades 6056, 2024 and 7075.

The titanium alloys include the alloys Ti-6-4, Ti-15-3-3-3, Ti-6-2-2-2-2 and Ti-3-2.5.

The substrate may take any form whatsoever, but generally takes the form of a plate, sheet, panel or foil. The process according to the invention, however, allows layers to be deposited on surfaces even of highly complex geometry. The surface on which the layer is deposited may be only part of the total surface of the substrate, but may also be the entirety of said surface; for example, with the process according to the invention, a layer can be deposited on both faces of a foil substrate.

Before the deposition of the composition on the surface, it is generally preferable to clean and/or activate and/or pickle the surface, for example by a chemical and/or physical and/or mechanical treatment.

This is because such cleaning is important in order to obtain effective adhesion of the layer which is deposited. These cleaning processes are known to the skilled person: they may involve cleaning by a wet method, for example by acidic or basic solutions, or alkaline or solvent degreasing, or else cleaning by a dry method, for example by shotblasting and/or sandblasting and/or flaming (flame treatment).

For certain supports, a particular treatment of the adhesion-promoting type, may be added.

Cleaning and/or activating treatments of this kind are known to the skilled person and are widely described in the prior art.

On the surface, preferably cleaned and activated, a curable composition is deposited which is, according to the invention, a curable composition comprising:

a) at least one radiation curable (polymerizable and/or crosslinkable) material capable of being polymerized and/or crosslinked by a radical polymerization reaction upon exposure to a radiation (also called a free radically radiation curable i.e. polymerizable and/or crosslinkable material, e.g. resin, or radiation curable radical material e.g. resin), said radiation curable material comprising at least two radically polymerizable functional groups;

b) at least one organofunctional silane of formula (I):

in which:
m is a number between 1 and 3;
OR' is an hydrolysable group; and
R is a hydrocarbyl group optionally containing at least one heteroatom, selected from among oxygen, and nitrogen atoms;

c) at least one organofunctional silane of formula (II):

in which:
m is a number between 1 and 3;
OR' is an hydrolysable group; and
R$^1$ is a hydrocarbyl group optionally containing at least one heteroatom, selected from among oxygen, and nitrogen atoms, and comprising at least one, and preferably one radically polymerizable functional group capable of polymerizing with one of the radically polymerizable functional group of the radiation-curable;

d) at least one cationic photoinitiator; and e) at least one radical photoinitiator.

The first essential component of the curable composition according to the invention is a radiation curable material capable of being polymerized and/or crosslinked by a radical polymerization reaction upon exposure to a radiation, also called a free radically radiation curable, i.e. polymerizable and/or crosslinkable material, e.g. resin, or radiation curable radical material e.g. resin.

By radiation curable material is meant a material such as a resin that polymerizes and/or crosslinks upon exposure to a radiation.

Said radiation is preferably a UV light, and said material is then called a photopolymerizable material, e.g. esin.

By radically radiation curable material e.g. resin, we generally mean a material which is constituted of monomers or oligomers bearing at least two radically polymerizable, e.g. photopolymerizable functional group. preferably acrylate, methacrylate, vinyl, or thiol groups. Said radiation curable material is usually called a resin, and may be a polymer, oligomer, or pre-polymer.

Examples of radiation curable radical materials, e.g. resins are given in Table I below:

TABLE I

| Commercial name | Manufacturer | Chemical name | Chemical structure |
|---|---|---|---|
| SR348C | SARTOMER | Ethoxylated Bisphenol A dimethacrylate (a + b = 3) | |
| SR239A | SARTOMER | 1,6-Hexanediol dimethacrylate | |
| CD262 | SARTOMER | 1,12-Dodecanedial dimethacrylate | |
| SR834 | SARTOMER | Tricyclodecane-dimethanol dimethacrylate | |
| CN159 | SARTOMER | Bisphenol A epoxy methacrylate | Unknown |
| SB500E50 | SARTOMER | Multifunctional Acid Oligomeric methacrylate diluted with 50% of TMPEOTA | Unknown |
| Rokracure VP5762 | KRAEMER | acrylic aliphatic urethane | Unknown |

TABLE I-continued

| Commercial name | Manufacturer | Chemical name | Chemical structure |
|---|---|---|---|
| Rokracure VP5550 | KRAEMER | modified urethane resin | Unknown |
| SR802 | SARTOMER | alkoxylated diacrylate | Unknown |
| SR595 | SARTOMER | 1,10 decanediol diacrylate |  |
| Ebecryl 171 | CYTEC | Methacrylated acidic derivative | Unknown |
| Laromer LR 9013 | BASF | modified unsaturated acrylate | Unknown |
| Ebecryl 3416 | CYTEC | Epoxy acrylate | Unknown |
| TPGDA | CYTEC | Tripropyleneglycol diacrylate | Unknown |
| Ebecryl 110 | CYTEC | Monoacrylate of ethoxylated phenol | Unknown |
| Ebecryl 3300 | CYTEC | Modified Epoxy Acrylate | Unknown |

Ebecryl ® (R) 171, Laromer ® (R) LR 9013, SR348C, SR802, SR595, and Rokracure ® (R) VP5550 give the best results having regard to the corrosion resistance of the hybrid sol-gel layer (SST test).

The second essential component of the curable composition according to the invention is a silane of formula (I):

$$R_{(4-m)}\text{—Si—}(OR')_m \quad (I)$$

in which:
m is a number between 1 and 3;
OR' is an hydrolysable group; and
R is a hydrocarbyl group optionally containing at least one heteroatom, selected from among oxygen, and nitrogen atoms.

In the silane of formula (I) m may be any number from 1 to 3, e.g. 1, 2, or 3. Although it will be appreciated that, in any single molecule, the number must be an integer, in practice, unless the material used is a pure single compound, the number may be non-integral. Preferably m is 3.

In the silane of formula (I), OR' represents a hydrolysable group, preferably an alkoxy group and more preferably an alkoxy group having from 1 to 6 carbon atoms and the silane of formula (I) is then called e.g. an organomono(trialkoxysilane) when m is 3.

Still more preferably the alkoxy group is a linear group.

A hydrolysable group is a group which undergoes separation or is removed from the Si atom when the silane is contacted with water (hydrolysis), and which does not remain attached to the metal atom. Said water is not added water but simply moisture that is present in the ambient atmosphere.

Examples of suitable alkoxy groups OR' include the methoxy, ethoxy, propoxy, isopropoxy, butoxy, isobutoxy, t-butoxy, pentyloxy, and hexyloxy groups. Among said alkoxy groups, the methoxy or ethoxy group is preferred, since longer alkoxides have very low reactivity for hydrolysis reactions. The methoxy group is the most preferred alkoxy group because methoxysilanes are more reactive than ethoxysilanes.

In the silane of formula (I), R is a hydrocarbyl group optionally containing at least one heteroatom, selected among oxygen, and nitrogen atom.

R may be a linear or branched alkyl group having 1 to 20C atoms, preferably 4 to 16C atoms, more preferably from 8 to 12C atoms optionally interrupted by at least one heteroatom, selected among oxygen, and nitrogen atoms, a cycloalkyl group having 3 to 20C atoms, for example 6C atoms, an aryl group having 3 to 20C atoms such as a phenyl group, an alkyl (1 to 20C)-aryl (3 to 20C) group, or an aryl (3 to 20C)-alkyl(1 to 20C) group, and R being optionally substituted by one or more substituent selected from the group consisting of halogen atoms, and amino groups.

In particular, the alkyl or cycloalkyl group of R may be perfluorinated. Examples of organo mono (trialkoxysilane) of formula (I) (OR' being an alkoxy group) are given in Table II below:

TABLE II

| Chemical name | Chemical structure |
|---|---|
| Phenyl trimethoxysilane | H₃CO—Si(OCH₃)(OCH₃)—C₆H₅ |
| Cyclohexyl trimethoxysilane | H₃CO—Si(OCH₃)(OCH₃)—C₆H₁₁ |
| Iso-Butyl trimethoxysilane | H₃CO—Si(OCH₃)(OCH₃)—CH₂CH(CH₃)₂ |
| Iso-Octyl trimethoxysilane | H₃CO—Si(OCH₃)(OCH₃)—(CH₂)₅CH(CH₃)₂ |
| Linear alkyltrimethoxysilane From C1 to C18 (CnTMS) | H₃CO—Si(OCH₃)(OCH₃)—(C)$_{n-2}$—CH₃ |

TABLE II-continued

| Chemical name | Chemical structure |
|---|---|
| 3-aminopropyl trimethoxysilane | 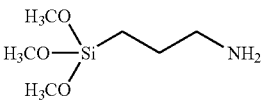 |

The linear alkyltrimethoxysilanes C8TMS, C10TMS and C12TMS give the best results having regard to the corrosion resistance of the hybrid sol-gel layer) (SST test), with C8TMS being most preferred.

The third essential component of the curable composition according to the invention is a "reactive" silane of Formula (II) above, preferably an organo mono(trialkoxysilane) of formula (II).

The silane, preferably organo mono(trialkoxysilane) of formula (II) above, may be selected from any of the silanes, preferably organo(trialkoxysilane)s of formula (I), recited above with the proviso that $R^1$ further comprises (carries) at least one radically polymerizable functional group, preferably 1 to 4 radically radiation polymerizable functional group, more preferably one radically radiation polymerizable functional group. In other words, the silane of formula (II) comprises at least one radically polymerizable functional group, preferably 1 to 4 radically polymerizable functional group, e.g. 1, 2, 3, or 4 radically polymerizable functional groups, more preferably one radically polymerizable functional group selected preferably from among acrylate, methacrylate, vinyl, and thiol radically polymerizable functional groups.

Most preferably, the silane of formula (II) is chosen from among: 3-methacryloxypropyltrimethoxysilane (MAPTMS), 3-(trimethoxysilyl)propyl acrylate (APTMS), and mixtures thereof.

The formulas of MAPTMS, APTMS, 3-mercaptopropyl trimethoxysilane, and vinyl trimethoxysilane are provided below:

| Chemical name | Chemical structure |
|---|---|
| 3-methacryloxypropyltrimethoxysilane (MAPTMS) | 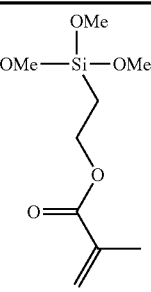 |
| 3-(trimethoxysilyl)propyl acrylate (APTMS) | 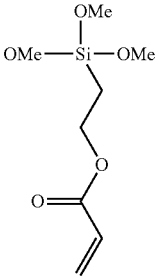 |
| 3-mercaptopropyl trimethoxysilane | 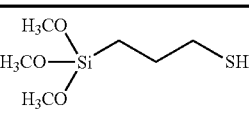 |
| Vinyl trimethoxysilane | 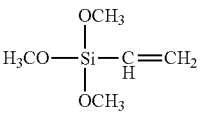 |

MAPTMS is preferred, especially because it is readily available and less expensive.

APTMS ET MAPTMS give equally good results having regard to corrosion resistance (SST) and solvent resistance.

The fourth essential component of the curable composition according to the invention is a cationic photoinitiator.

By cationic photoinitiator, is generally meant a compound that upon irradiation, e.g. UV irradiation, dissociates into two or more components, one of which is a strong acid that can initiate the polymerization of both the silanes and of the radiation curable resin.

Examples of cationic photoinitiators are the so-called onium salts such as the diazonium, iodonium and sulphonium salts. Other examples of cationic photoinitiators are the organometallic complexes such as the metallocenium salts, e.g. the ferrocenium salts.

Said salts also contain a negatively charged counterion such as $BF_4^-$, $PF_6^-$, $SBF_6^-$, $AsF_6^-$ etc.

The cationic photoinitiator may also be selected from among the non-ionic photoacids.

It might be necessary to use sensitizing molecules to enhance the sensitivity of the photoinitiator to the UV wavelengths emitted by the UV lamp.

The onium salts may be selected from among the group consisting of diaryliodonium salts and derivatives thereof, triarylsulfonium salts and derivatives thereof, and mixtures thereof. Said onium salts have preferably hexafluoroantimonate, hexafluorophosphate or tetrafluoroborate anions. Preferably the onium salts may be selected from among the group consisting of (4-methylphenyl)[4-(2-methylpropyl)phenyl]iodonium hexafluorophosphate, Bis-(4-methyl-phenyl)iodonium hexafluorophosphate), Bis(dodecyl phenyl) iodonium hexafluorophosphate, 9-(4-hydroxyethoxyphenyl) thianthrenium hexafluorophosphate, diphenyl iodonium triflate, and mixtures thereof.

The organometallic complexes may be selected from metallocenium salts, preferably ferrocenium salts such as cyclopentadienylcumen-iron hexafluorophosphate.

The non-ionic photoacids may be selected from among the group consisting of alkyl/aryl sulfonic acid, fluorinated sulfonic acids, sulfonimides, tetra-aryl boronic acids, and mixtures thereof.

Examples of such non-ionic photo acids are the products known under the commercial names of PAG 103 and PAG 121.

Examples of cationic photoinitiators are given in Table III below:

TABLE III

| Commercial name | Chemical name | Chemical structure |
| --- | --- | --- |
| IRGACURE 250 | (4-methylphenyl)[4-(2-methylpropyl)phenyl]iodonium hexafluorophosphate | 75 wt % in propylene carbonate |
| Bluesil PI 2074 | (4-(1-methylethyl)phenyl)(4-méthylphényl)iodonium tetrakis (pentafluorophenyl)borate (1-) | |
| DEUTERON UV 2257 | Bis-(4-methyl-phenyl)iodonium hexafluorophosphate) | 50 wt % in propylene carbonate |
| UV 1241 | Bis(dodecyl phenyl) iodonium hexafluorophosphate | 50 wt % in C12/C14 Glycidylether |
| Esacure 1187 | 9-(4-hydroxyethoxyphenyl) thianthrenium hexafluorophosphate | 75 wt % in propylene carbonate |
| Sigma Aldrich 530972 | diphenyl iodonium triflate | |
| PAG 103 | Non-ionic photoacids | |

TABLE III-continued

| Commercial name | Chemical name | Chemical structure |
|---|---|---|
| PAG 121 | Non-ionic photoacids | 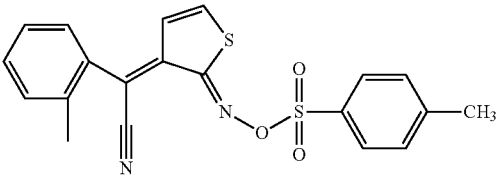 [SMILES: Cc1ccc(S(=O)(=O)O/N=C2\SC=C\C2=C(\C#N)c2ccccc2C)cc1] |

Irgacure ® 250, BLUESIL ® PI2074, DEUTERON ® UV 2257 and DEUTERON ® UV 1241 give the best results having regard to corrosion protection (SST).

The fifth essential component of the curable composition according to the invention is a radical photoinitiator.

By radical photoinitiator, is generally meant a compound that upon irradiation, e.g. UV irradiation generates free, reactive radicals that can initiate both:

- the polymerization of the radiation curable resin, by reaction of one of the (at least two) radically polymerizable functional groups of said radiation curable resin thus forming an organic network, and
- the covalent bonding of said organic network to the inorganic network formed by cationic sol-gel polymerization of the silanes, by reaction of another radically polymerizable functional group of said radiation curable resin with the radically polymerizable functional group of the silane of formula (II).

Examples of radical photoinitiators are given in Table IV below:

The hybrid sol gel layer prepared by using the curable composition according to the invention has outstanding corrosion resistance properties even without including any anti-corrosion additive or corrosion inhibitor.

In other words, a hybrid sol-gel layer prepared from a composition according to the invention free of any corrosion inhibitor already has excellent corrosion resistance properties as assessed by the Salt Spray Test according to NF EN ISO 9227:2007.

However, the curable composition according to the invention may further comprise at least one corrosion inhibitor to further improve the corrosion resistance of the hybrid sol-gel layer prepared from the composition.

By corrosion inhibition in the context of the present invention, it is meant a chemical compound that decreases the corrosion rate of a material e.g. in the Salt Spray Test according to NF EN ISO 9227:2007.

Said corrosion inhibitor may be selected from among corrosion inhibitors in the form of pigments (i.e. pigments that

TABLE IV

| Commercial name | Chemical name | Chemical structure |
|---|---|---|
| Darocur 1173 | 2-hydroxy-2-methyl-1-phenyl-propan-1-one | 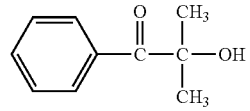 |
| Irgacure 2100 | Phenylbis(2,4,6-trimethylbenzoyl)-phosphine oxide | 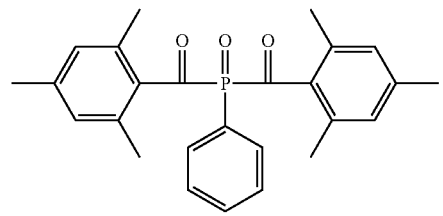 |
| Additol hdmap | 2-benzoyle-2-propanone | 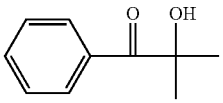 |

The five components recited above are the essential components of the sol according to the invention, and form a base composition to which, depending on the requirements and the desired properties, it is possible to add one or more additional, optional components, which are described below.

also have a corrosion inhibition action or corrosion inhibiting pigments) and organic salts. Corrosion inhibiting pigments are preferred.

Examples of corrosion inhibitors in the form of pigments and of organic salts are given in TABLES V and VI below:

TABLE V

| Commercial name of the corrosion inhibitors in the form of pigments | Manufacturer | Chemical Nature |
| --- | --- | --- |
| Shieldex AC5, Shieldex AC3 | GRACE | calcium ion-exchanged, synthetic amorphous silica |
| Novinox PAS | SNCZ | Modified aluminium polyphosphate |
| Nubirox 106 | NUBIOLA | Organophilized zinc phosphate and zinc molybdate |
| Nubirox 302 | NUBIOLA | Organophilized calcium strontium phosphosilicate |
| Zelec 1410T, Zelec 3410T | MILLIKEN | Antimony Tin Oxide (ATO) complex |
| $Pr_2O_3$ | SIGMA ALDRICH | Praseodynium (III) oxyde |
| Heucophos SRPP | HEUBACH | strontium aluminium polyphosphate hydrate |
| Heucorine RZ | HEUBACH | Zinc-5-Nitroisophthalate |
| Heucophos SAPP | HEUBACH | strontium aluminium polyphosphate hydrate |
| Albawhite 70 | SACHTLEBEN | barium sulfate |
| $SrTiO_3$ | SIGMA ALDRICH | strontium titanate |
| Mo | SIGMA ALDRICH | Molybdenum nanoparticles |

TABLE VI

ORGANIC corrosion inhibitors

| Commercial name | Manufacturer | Chemical Nature |
| --- | --- | --- |
| β-cyclodextrine | SIGMA ALDRICH | β-cyclodextrine 2-Mercaptobenzothiazole |

Surprisingly, only some of said corrosion inhibitors such as Shieldex® AC3 and $Pr_2O_3$ show a kind of synergistic effect and improve in an unexpected manner the corrosion resistance properties.

The concentration of the corrosion inhibitor may be from 1% to 20% by weight, preferably from 2.5% to 10% by weight, more preferably from 5% to 10% by weight, of the total weight of the curable composition.

The composition according the invention may further comprise at least one wetting agent.

The wetting agent may be present in an amount of from 0.03% and 5% by weight, preferably from 0.1 and 0.7% by weight of the total weight of the curable composition.

The wetting agent may be selected from among silicon surface additives; preferably, the wetting agent is a polyether modified polydimethylsiloxane.

An example of such a wetting agent is BYK® 333.

By wetting agent is meant a surfactant that lowers the surface tension of the liquid curable composition according to the invention, rather the interfacial tension between the curable composition and the substrate surface.

The wetting agent improves the mixing of the various components of the composition and the adherence of the hybrid sol-gel coating to a metal surface or any other smooth surface.

The wetting agent enhances the wetting and spreading properties on various substrates, but also the quality of the network formed and the intrinsic anti-corrosion properties of the hybrid sol-gel film.

The improvement in wetting by addition of suitable wetting agents allows uniform films to be obtained without popping phenomena or phenomena of shrinkage on drying, on correctly prepared surfaces.

The possible anti-corrosion properties of the wetting agent may then reinforce the quality of the protection.

The composition may further comprise at least one filler preferably selected from micas, silicas, talcs, clays, PTFE powders, and so on which, by virtue of their structure, for example their lamellar or nodular structure, and/or of their size, for example micro or nano size, may optimize certain properties, such as the anti-sagging, hardness, scratch test resistance, anti-corrosion, properties of the hybrid sol-gel film.

The filler such as a talcs, mica, silica or clay is generally in the form of particles, or nanoparticles whose surface may be modified.

The filler may be present in an amount of 1% to 20% by weight, preferably of 3% to 10% by weight of the total weight of the curable composition.

The curable composition according to the invention may further comprise one or more conductive materials selected, for example, from salts, electrolytes, redox couples, conductive pigments and conductive polymers e.g. of polyaniline type, ferrocenes, sulfurated polystyrene, carbon blacks, and all of the other compatible products having the characteristic of conducting electrical charges.

The curable composition according to the invention may further comprise at least one dye and/or at least one pigment. Pigments also include nacres, lakes and mixtures thereof.

The dye may be used as an indicator of the suitable application of the wet layer and/or of the suitable curing after complete bleaching under light curing.

The pigments may be selected from decorative pigments and pigments used to enhance the conductivity and/or reflectivity of the film.

As already mentioned above, some pigments may also play the role of corrosion inhibiting agents.

Said dye(s) and/or pigment(s), may be present in an amount of 0.01 to 40% by weight, preferably of 0.05 to 20% by weight of the total weight of the composition.

The composition according to the invention is a 1-K formulation. In other words, the components making up the composition are not stored separately and only mixed shortly before use. The composition can be stored for a long period of time without of course being exposed to a radiation such as an UV light.

The deposition of the curable composition on the surface, which preferably has been cleaned and/or activated beforehand, may be accomplished by any technique known to the skilled person, such as bar coating, roll coating, spraying, sprinkling or dipping. The preferred techniques are the spraying or roll coating techniques.

The operation of depositing, applying, the curable composition to the surface is generally carried out at room, ambient temperature e.g. from 10° C. to 30° C., preferably from 15° C. to 25° C., more preferably from 20° C. to 23° C.

After deposition, a substrate is obtained whose surface is coated with a layer of the curable composition.

This layer of the curable composition is subsequently cured by exposure to a radiation, preferably to UV light in a way known in this field of the art, for example by using a UV lamp and a UV conveyor. In the same time the sol-gel reaction proceeds due to ambient atmospheric humidity.

The light intensity is generally from 2 to 20 J/cm$^2$, for example 10 J/cm$^2$.

It is possible to deposit only a single hybrid sol-gel layer by the method according to the invention; this sol-gel layer generally has a dry thickness of from 1 μm to 80 μm, preferably from 5 to 45 μm, more preferably from 10 to 25 or 30 μm.

This layer generally has a thickness greater than that of the sol-gel layers of the prior art prepared from diluted sols, namely a dry thickness of 0.1 to 0.4 μm, preferably of 0.2 to 0.3 μm.

It is also possible to deposit two or more hybrid sol-gel layers according to the invention so as to form a multi-layer coating, each layer having a composition different from the preceding layer and from the following layer, and each deposited layer exhibiting different properties, selected from the properties set out below.

Generally speaking, it is possible to deposit from 1 to 5 layers, preferably from 2 to 3 layers.

According to the various additives incorporated in the curable composition, the deposited hybrid sol-gel layer will be able to possess a variety of properties.

The skilled person is easily able to determine what additive or additives should be incorporated, where appropriate, into the composition according to the invention, which compulsorily comprises the components mentioned above, in order to obtain hybrid sol-gel layers which possess the properties below. Thus, it will be possible to prepare anti-scratch; anti-abrasion; anti-friction; anti-fog; anti-static; anti-reflection; electroluminescent; photovariable; conducting (high and low K); superconducting; ferroelectric (piezoelectric and pyroelectric); barrier (to gases; to bases, to acids, to various chemical products, including strippers, hydraulic fluids such as "Skydrol"); soil-repellent; thermochromic; luminescent; non-linear optical; flame-retardant; sol-gel coating for composites; anti-adherent (adhesive resistant); insulating; anti-fouling; primer; paint; hydrophobic; hydrophilic; porous; biocidal; anti-odour; mold release agent and anti-wear hybrid sol-gel layers, etc.

According to the invention, it is also possible to prepare a multi-layer coating exhibiting any combination of properties from among those set out above.

The invention will now be described with reference to the examples which follow, and which are given by way of illustration and not of limitation.

EXAMPLES

In the following experimental examples, radiation curable compositions, formulations according to the invention are prepared, said compositions are deposited as films, on a surface of substrates, namely the surface of aluminium panels, said films are then cured and the properties of the hybrid sol-gel films according to the invention so prepared are evaluated.

1.1. Preparation of the Radiation Curable Compositions.

The radiation curable formulations are prepared by mixing the acrylate and/or the methacrylate resins with the alkoxysilanes. The solution is stirred for about 10 minutes, then the cationic photoinitiator and the radical photoinitiator, and, if required, the wetting agent, are added.

The solution is stirred, at least, for 30 minutes.

When corrosion inhibitor(s) are used, the formulations are prepared by first mixing the acrylate or the methacrylate resin(s) with the corrosion inhibitors.

The solution is magnetically stirred at least 30 min.

Then the alkoxysilanes are added and the solution is stirred for 10 min.

Then the cationic and radical photoinitiators are added and the solution is further stirred for 30 min.

The formulation can be applied within 30 min after the end of stirring.

1.2. Substrates.

The substrates are 2024 T3 aluminium alloys panels.

1.3. Substrate Preparation.

The copper added in the 2024 aluminium alloy tends to deteriorate the protective layer of the natural oxide layer. Consequently it is crucial to prepare the surface of the aluminium panels to eliminate superficial contaminants, to eliminate oxides which could interfere with the finishing steps, and to be closer to the heart metal composition.

Thus, the Aluminium alloy panels (2024 T3) are first cleaned of superficial dust with DIESTONE DLS. Then, the panels are degreased in a 10 vol % SOCOCLEAN A 3431 bath at pH 9 under stirring for 15 min at 45° C. The panels are then rinsed twice. The first rinse is performed in tap water for two minutes and the second rinse is performed in distilled water for two minutes. The second surface treatment is an etching treatment in a SOCOSURFA1858/SOCOSURF A1858 (40/10 vol %/vol %) bath under stirring. The panels are dipped in the bath for 10 min at 52° C. The panels are rinsed twice in distilled water and dried for a few minutes at 60° C. The panels have to be used within the next 24 hours.

1.4. Application of the Formulations to the Aluminium Alloy Substrates.

The films were prepared by applying the formulations onto the aluminium alloy substrates using an automatic film applicator equipped with a 26 μm wire wound bar.

1.5. Photopolymerization.

The photocuring, UV curing process is performed on an ultraviolet conveyor with a belt speed of 10 m/min for 5 successive passes using a Fusion lamp (H lamp, light intensity: ca 10 J/cm2).

The thicknesses of the cured film could vary from 1 to 80 micrometers, preferably from 5 and 45 micrometers.

The samples i.e. the aluminium alloy panels coated with a cured hybrid sol-gel layer are then ready for a technical characterization.

1.6. Characterization of the Samples.

Thickness:

The average deposited thickness of the cured film, layer, is measured according to the ISO 2360:2003 standard using an ELCOMETER® 355 apparatus fitted with the N4 probe for aluminium panels (measurements based on Eddy current).

Three measurements are performed, namely at the top, in the middle, and at the bottom of the panels. The average thickness is noted.

Solvent Resistance:

The solvent resistance is evaluated according to the ISO 2812-1:1993 standard. The coated panel is exposed to solvents at room temperature by drop contact followed by full immersion if the coatings were found to be solvent resistant.

The solvent used for this test is a mixture of toluene, butyl acetate and methylethylketone in proportion 1/3, 1/3 and 1/3 respectively.

The chemical resistance is high if no blistering, cracking, destruction of the coating is observed after 2 hours.

Salt Spray test ("SST"):

Salt Spray Test (SST) is used for assessment of the corrosion resistance of metallic materials. This test is performed according to the NF EN ISO 9227:2007 standard.

The coated aluminium alloy panels to be tested are placed into a cabinet (a Q-FOG Cyclic Corrosion tester climatic chamber from Q-Panel) at 35° C.±2° C. on racks with an angle of 20°±5° from vertical. They are exposed to an artificial fog composed of a sodium chloride solution. This solution has to contain 50 g/L±5 g/L of sodium chloride and its pH shall be 6.5 to 7.2 at 25° C.° C.±5° C. All the tests were performed in a SST apparatus conform to the NF EN ISO 9227:2007 standard. The panels were observed regularly and every apparition of corrosion (uniform corrosion, pits, "worms" . . . ) was noted. The final requirement for resistance to SST is 3000 h exposure.

Cross-cut test:

Cross-cut Test (SST) is performed according to the ISO 2409:2003 standard.

Example 1

In this example, aluminium alloy panels coated with a cured hybrid sol-gel layer are prepared by the procedure outlined hereinabove using the following inventive radiation curable formulation (Formulation 1):

Formulation 1:

Radiation curable radical resin: Ethoxylated Bisphenol A dimethacrylate SR348C (30.7 wt %);

Organo (trialkoxysilane) with organic reactive group: 3-(trimethoxysilyl)propyl acrylate (APTMS) (30.7 wt %);

Organo (trialkoxysilane) without organic reactive group: $C_8TMS$ (30.7 wt %);

Radical photoinitiator: 2-Hydroxy-2-methyl-1-phenyl-propan-1-one (2 wt %);

Cationic photoinitiator: 4-methylphenyl) [4-(2-methylpropyl)phenyl]iodonium hexafluorophosphate (1 wt %);

Corrosion inhibitors: 4.9 wt % Shieldex AC3.

The same results have been obtained when substituting $Pr_2O_3$ for Shieldex AC3.

Characterization results of the samples prepared using this Formulation 1:

Thickness (ISO 2360:2003): 20-25 μm
Solvent resistance (ISO 2812-1:1993): >2 hours
SST Tests (NF EN ISO 9227:2007): >3000 hours
Cross-cut Test (ISO 2409:2003): Pass (Class 0)

Example 2

In this example, aluminium alloy panels coated with a cured hybrid sol-gel layer are prepared by the procedure outlined hereinabove using the following inventive radiation curable formulation (Formulation 2):

Formulation 2:

1 wt % Cationic photoinitiator: (4-methylphenyl) [4-(2-methylpropyl)phenyl]iodonium hexafluorophosphates;

2 wt % Radical photoinitiator: 2-hydroxy-2-methyl-1-phenyl-propan-1-one;

0.5 wt % wetting agent: polyether modified polydimethylsiloxane;

The remaining material being Ethoxylated Bisphenol A dimethacrylate (a+b=3), (3-trimethoxysilyl)propyl acrylate, and linear alkyltrimethoxysilane $C_8TMS$ in equal proportions.

Characterization results of the samples prepared using this Formulation 2:

Thickness (ISO 2360:2003): 20-25 μm
Solvent resistance (ISO 2812-1:1993): >2 hours
SST Tests (NF EN ISO 9227:2007): >3000 hours
Cross-cut Test (ISO 2409:2003): Pass (class 0)

Example 3

In this example, aluminium alloy panels coated with a cured hybrid sol-gel layer are prepared by the procedure outlined hereinabove using the following inventive radiation curable formulation (Formulation 3):

Formulation 3:

1 wt % Cationic photoinitiator: (4-methylphenyl) [4-(2-methylpropyl)phenyl]iodonium hexafluorophosphates;

6 wt % Radical photoinitiator: 2-hydroxy-2-methyl-1-phenyl-propan-1-one;

Corrosion inhibitors: 4.9 wt % Shieldex AC3.

The remaining material being Ethoxylated Bisphenol A dimethacrylate (a+b=3), (3-methacryloxypropyltrimethoxysilane (MAPTMS), and linear alkyltrimethoxysilane $C_8TMS$ in equal proportions.

The same results have been obtained when substituting $Pr_2O_3$ for Shieldex AC3.

Characterization results of the samples prepared using this Formulation 2:

Thickness (ISO 2360:2003): 20-25 μm
Solvent resistance (ISO 2812-1:1993): >2 hours
SST Tests (NF EN ISO 9227:2007): >3000 hours
Cross-cut Test (ISO 2409:2003): Pass (class 0)

Example 4

In this example, aluminium alloy panels coated with a cured hybrid sol-gel layer are prepared by the procedure outlined hereinabove using the following inventive radiation curable formulation (Formulation 4), comprising a mix of resins:

Formulation 4:

1 wt % Cationic photoinitiator: (4-methylphenyl) [4-(2-methylpropyl)phenyl]iodonium hexafluorophosphates;

6 wt % Radical photoinitiator: 2-hydroxy-2-methyl-1-phenyl-propan-1-one;

5 wt % Methacrylated acidic derivative (Ebecryl 171)

The remaining material being Ethoxylated Bisphenol A dimethacrylate (a+b=3), (3-methacryloxypropyltrimethoxysilane (MAPTMS), and linear alkyltrimethoxysilane $C_8TMS$ in equal proportions.

Characterization results of the samples prepared using this Formulation 2:

Thickness (ISO 2360:2003): 20-25 μm
Solvent resistance (ISO 2812-1:1993): >2 hours
SST Tests (NF EN ISO 9227:2007): >3000 hours
Cross-cut Test (ISO 2409:2003): Pass (class 0).

What is claimed is:

1. Radiation curable composition for preparing a hybrid sol-gel layer on a surface of a substrate, wherein said composition comprises:
    a) at least one radiation curable material capable of being polymerized and/or crosslinked by a radical polymerization reaction upon exposure to a radiation, said radiation curable material comprising at least two radically polymerizable functional groups;

b) at least one organofunctional silane of formula (I):

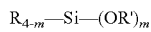 (I)

in which:
m is a number from 1 to 3;
OR' is an hydrolysable group; and
R is a linear or branched alkyl group having 1 to 20C atoms, a cycloalkyl group having 3 to 20C atoms, an aryl group having 3 to 20C atoms, an alkyl (1 to 20C)-aryl (3 to 20C) group, or an aryl (3 to 20C)-alkyl(1 to 20C) group;

c) at least one organofunctional silane of formula (II):

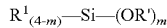 (II)

in which:
m is a number from 1 to 3;
OR' is an hydrolysable group; and
$R^1$ is a hydrocarbyl group comprising at least one radically polymerizable functional group capable of polymerizing with one of the radically polymerizable functional group of the radiation-curable material;

d) at least one cationic photoinitiator; and
e) at least one radical photoinitiator.

2. Composition according to claim 1, wherein the silane of formula (I) is an organo mono (trialkoxysilane) in which:
R' is a linear or branched alkyl group having 1 to 6C atoms.

3. Composition according to claim 1, wherein the silane of formula (II) is an organo mono (trialkoxysilane) in which:
R' is a linear or branched alkyl group having 1 to 6C atoms, and
R1 is a linear or branched alkyl group having 1 to 20C atoms, a cycloalkyl group having 3 to 20C atoms, an aryl group having 3 to 20C atoms, an alkyl (1 to 20C)-aryl (3 to 20C) group, or an aryl (3 to 20C)-alkyl(1 to 20C) group, R1 comprising (carrying) at least one radically polymerizable functional group capable of polymerizing with one of the radically polymerizable functional group of the radiation-curable material.

4. Composition according to claim 1, wherein the radically polymerizable functional groups of the radiation curable material and of the silane of formula (II) are selected from among the group consisting of acrylate, methacrylate, vinyl, and thiol functional groups.

5. Composition according to claim 1, wherein, the radiation-curable material is selected from the group consisting of standard acrylate-, methacrylate-, vinyl-, or thiol-, terminated materials.

6. Composition according to claim 1, wherein the cationic photoinitiator is selected from among the group consisting of onium salts, organometallic complexes, non-ionic photoacids, and mixtures thereof.

7. Composition according to claim 1, wherein the cationic photoinitiator is combined with a sensitizer.

8. Composition according to claim 1, wherein the radical photoinitiator is selected from among type I photoinitiators consisting of hydroxyacetophenones, alkylaminoacetophenones, benzyl ketals and dialkoxyacetophenones, benzoin ethers, phosphine oxides, and mixtures thereof.

9. Composition according to claim 1, further comprising at least one corrosion inhibitor.

10. Composition according to claim 1, further comprising at least one wetting agent.

11. Composition according to claim 1, further comprising at least one filler.

12. Composition according to claim 1, further comprising at least one dye and/or pigment.

13. Composition for preparing a hybrid sol-gel layer on a substrate surface comprising:
(i) 2 wt % 2-hydroxy-2-methyl-1-phenyl-propan-1-one;
(ii) 0.5 wt % (4-methylphenyl)[4-(2-methylpropyl)phenyl] iodonium Hexafluorophosphate;
(iii) 0.5 wt % wetting agent: polyether modified polydimethylsiloxane;
(iv) the remaining material being Ethoxylated Bisphenol A dimethacrylate, n-octyltrimethoxysilane, 3-methacryloxypropyltrimethoxysilane (MAPTMS) or 3-(trimethoxysilyl)propyl acrylate (APTMS) in equal proportions.

14. Method for preparing a hybrid sol-gel layer on a surface of a substrate comprising:
depositing on the surface a radiation curable composition comprising:
a) at least one radiation curable material capable of being polymerized and/or crosslinked by a radical polymerization reaction upon exposure to a radiation, said radiation curable material comprising at least two radically polymerizable functional groups;
b) at least one organofunctional silane of formula (I):

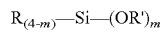 (I)

in which:
m is a number from 1 to 3;
OR' is an hydrolysable group; and
R is a linear or branched alkyl group having 1 to 20C atoms, a cycloalkyl group having 3 to 20C atoms, an aryl group having 3 to 20C atoms, an alkyl (1 to 20C)-aryl (3 to 20C) group, or an aryl (3 to 20C)-alkyl(1 to 20C) group;

c) at least one organofunctional silane of formula (II):

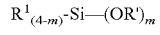 (II)

in which:
m is a number from 1 to 3;
OR' is an hydrolysable group; and
$R^1$ is a hydrocarbyl group and comprising at least one radically polymerizable functional group capable of polymerizing with one of the radically polymerizable functional group of the radiation-curable material;

d) at least one cationic photoinitiator; and
e) at least one radical photoinitiator;
to give a layer of the composition on the surface of the substrate; and
curing said layer of the composition by exposure to a radiation and to ambient atmospheric humidity whereby a hybrid sol-gel layer is obtained on the surface of the substrate.

15. Method according to claim 14, wherein the curable composition is deposited by bar coating, roll coating, spraying, sprinkling or dipping.

16. Method according to claim 14, wherein, before the deposition of the curable composition, the surface is cleaned and/or activated and/or pickled by a chemical and/or physical and/or mechanical treatment.

17. Hybrid sol-gel layer prepared by the method according to claim 14.

18. Substrate comprising at least one surface coated with at least one hybrid sol-gel layer according to claim 17.

19. Substrate according to claim 18 which is, or is a part of, an aircraft; an aerospace vehicle; a marine vessel; an offshore platform; or a motor vehicle.

20. Method for preparing a coating comprising two or more layers on a surface of a substrate, at least one of these layers being a hybrid sol-gel layer prepared by the method according to claim 14.

21. Method according to claim 20, for preparing a coating comprising two or more layers on a surface of a substrate, wherein:
   A first hybrid sol-gel layer is prepared on said surface; then
   One or more other layers is (are) applied to said hybrid sol-gel layer, said other layers being selected from anti-corrosive primer, decorative paint, top coat, clear coat, sealant, adhesive, and resin layers.

22. Method according to claim 14, wherein the substrate is made of a material selected from the group consisting of metals; metal alloys; organic or inorganic glasses; organic polymers such as plastics; wood; ceramics; textiles; concretes; papers; stone; carbon fibres and carbon fibres composites; and composite materials comprising two or more of the aforementioned materials.

23. Method according to claim 22, wherein the metals and the metal alloys comprise at least one of aluminium; titanium; copper; iron; magnesium; and alloys thereof.

24. Method according to claim 23, wherein the material of the substrate is at least one of: plated, surface-treated, and coated.

\* \* \* \* \*